(12) United States Patent
Franzone, Jr.

(10) Patent No.: US 7,922,219 B2
(45) Date of Patent: Apr. 12, 2011

(54) CONNECTING CLIP

(75) Inventor: Andrew Lawrence Franzone, Jr., Westhampton, NY (US)

(73) Assignee: Allen Field Company, Inc., Farmingdale, NY (US)

( * ) Notice: Subject to any disclaimer, the term of this patent is extended or adjusted under 35 U.S.C. 154(b) by 508 days.

(21) Appl. No.: 11/451,750

(22) Filed: Jun. 12, 2006

(65) Prior Publication Data

US 2007/0294864 A1 Dec. 27, 2007

(51) Int. Cl.
*E05C 19/00* (2006.01)
(52) U.S. Cl. .................. 292/1; 292/341.15; 292/341.17; 292/DIG. 38
(58) Field of Classification Search ......... 292/1, 341.15, 292/341.17, DIG. 38; 24/458, 453; 174/153 G, 174/152 G
See application file for complete search history.

(56) References Cited

U.S. PATENT DOCUMENTS

| | | | |
|---|---|---|---|
| 3,744,104 A * | 7/1973 | Ford | 24/543 |
| 4,066,373 A * | 1/1978 | Workman | 403/391 |
| 5,411,427 A * | 5/1995 | Nelson et al. | 446/71 |
| 5,417,531 A | 5/1995 | Brown | 411/344 |
| 5,577,395 A * | 11/1996 | Kuykendall | 63/3 |
| 5,598,608 A * | 2/1997 | Naslund | 24/30.5 R |
| 5,862,917 A * | 1/1999 | Noble et al. | 206/600 |
| 5,979,095 A * | 11/1999 | Schneider et al. | 40/633 |

FOREIGN PATENT DOCUMENTS

EP 11 154 165 A3 4/2003

OTHER PUBLICATIONS

"T-Joints", Product Data Sheet, Allen Field Companies, Inc., 2004, 2 pages.
Photgraphs of model 35HP460W T-Joint manufactured by Allen Field Companies, Inc.
Photographs of model 35HP602W T-Joint manufactured by Allen Field Companies, Inc.

* cited by examiner

*Primary Examiner* — Carlos Lugo
*Assistant Examiner* — Mark Williams
(74) *Attorney, Agent, or Firm* — Harrington & Smith

(57) ABSTRACT

A connecting clip for connecting two members to each other at apertures through the two members. The connecting clip includes a first section connected to a second section by a living hinge. The first section includes a general ring shaped portion forming a hole, a first stationary projection extending away from the general ring shaped portion at a rear side of the general ring shaped portion, and a movably second projection connected to the general ring shaped portion by another living hinge. The second projection is movable to a deployed position extending out of the hole with an end of the second projection extending in a direction different from the first projection. The second section includes a pushing portion adapted to push against the second projection when the second section is moved from an open position to a closed position to thereby move the second projection to the deployed position.

8 Claims, 8 Drawing Sheets

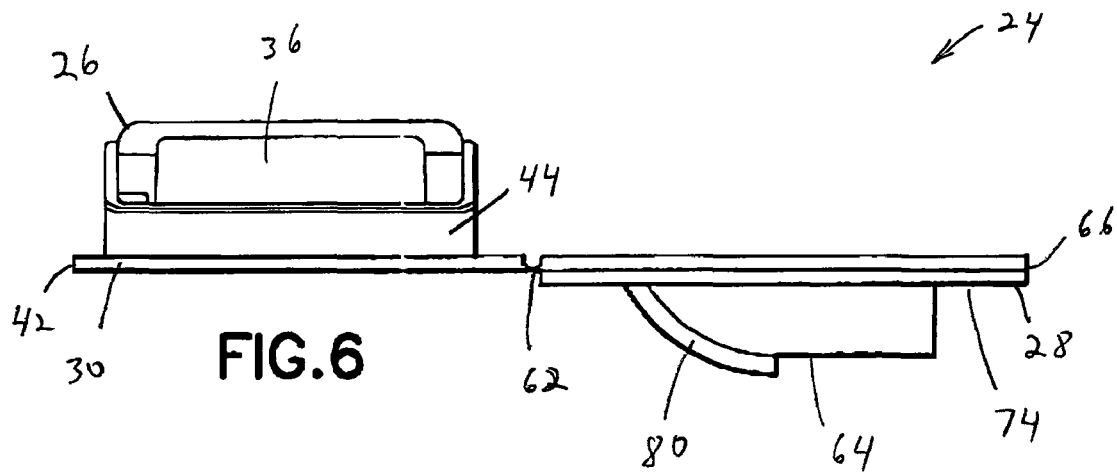
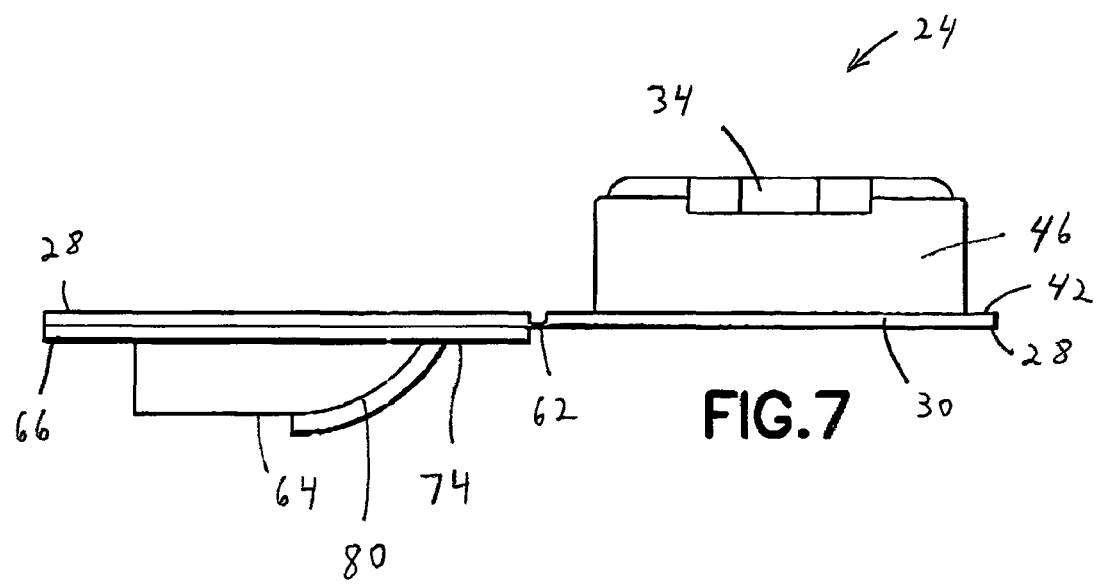

CONNECTING CLIP

BACKGROUND OF THE INVENTION

1. Field of the Invention

The invention relates to a mechanical connector and, more particularly, to a mechanical connector having living hinges.

2. Brief Description of Prior Developments

Connecting clips are know for connecting two members, such as a top member and a bottom member of a box, to one another at apertures through the two members. The connecting clips are one piece members made of plastic or polymer material and can comprise members connected to each other by a living hinge. Allen Field Companies, Inc. of Farmingdale, N.Y. manufactures various different types of connector clips, also known as T-Joints.

A problem exists with connecting some types of connecting clips at apertures through box pieces in that spacing between the box pieces at the apertures can make it difficult to latch the connecting clips into closed positions. Sometimes an assembler has to use a mallet to forceable hit the connecting clip to latch the connecting clip into a closed position. This is not a desired method for a box carrying a relatively easily damageable item such as a computer, or a computer monitor, or a flat panel television (LCD, Plasma, etc.) for example. There is a desire provide a connecting clip which can be manually closed by hand even when there is spacing between the box pieces at the apertures, thereby eliminating the need to hit the connecting clip with a mallet or similar high impact closing method.

SUMMARY OF THE INVENTION

In accordance with one aspect of the invention, a connecting clip is provided for connecting two members to each other at apertures through the two members. The connecting clip includes a first section connected to a second section by a living hinge. The first section includes a general ring shaped portion forming a hole, a first stationary projection extending away from the general ring shaped portion at a rear side of the general ring shaped portion, and a movably second projection connected to the general ring shaped portion by another living hinge. The second projection is movable to a deployed position extending out of the hole with an end of the second projection extending in a direction different from the first projection. The second section includes a pushing portion adapted to push against the second projection when the second section is moved from an open position to a closed position to thereby move the second projection to the deployed position.

In accordance with another aspect of the invention, a connecting clip is provided for connecting two members to each other at apertures through the two members. The connecting clip comprises a first section, a second section, a latching system, and a latch release system. The first section comprises a general ring shaped portion forming a hole, a first stationary projection extending upward away from the general ring shaped portion at a rear side of the general ring shaped portion, a movably second projection connected to the general ring shaped portion by a first living hinge. The second projection comprises a general L shape. The second projection is located in the hole. The second projection extends more than half a height and length of the hole, and the second projection is movable to a deployed position extending out of the hole with an end of the second projection extending in a down direction. The second section is movably connected to the first section by a second living hinge. The second section comprises a flange and a pushing portion extending from the flange and adapted to push against the second projection when the second section is moved from an open position to a closed position to thereby move the second projection to the deployed position. The latching system is adapted for latching the second section to the first section when the second section is moved to the closed position. The latch release system is adapted for releasing the latching of the second section to the first section by the latching system. The latch release system comprises a finger recess in the second section and a delatching lever connected to a cantilevered latch of the latching system.

In accordance with another aspect of the invention, a connecting clip is provided for connecting two members to each other at apertures through the two members. The connecting clip comprises a first section and a second section. The first section comprises a general ring shaped portion forming a hole, a first stationary projection extending in a first direction from the general ring shaped portion at a rear side of the general ring shaped portion, and a single movably second projection connected to the general ring shaped portion by a first living hinge. The second projection is located in the hole. The second projection extends more than half a height of the hole and the second projection is movable to a deployed position extending out of the hole with an end of the second projection extending in a second direction substantially opposite to the first direction. The second section is movably connected to the first section by a second living hinge. The second section comprises a pushing portion adapted to push against the second projection when the second section is moved from an open position to a closed position to thereby move the second projection to the deployed position.

BRIEF DESCRIPTION OF THE DRAWINGS

The foregoing aspects and other features of the invention are explained in the following description, taken in connection with the accompanying drawings, wherein:

FIG. 6 is a top plan view of the connecting clip shown in FIG. 3;

FIG. 7 is a bottom plan view of the connecting clip shown in FIG. 3;

DETAILED DESCRIPTION OF THE PREFERRED EMBODIMENT

Figure 1:
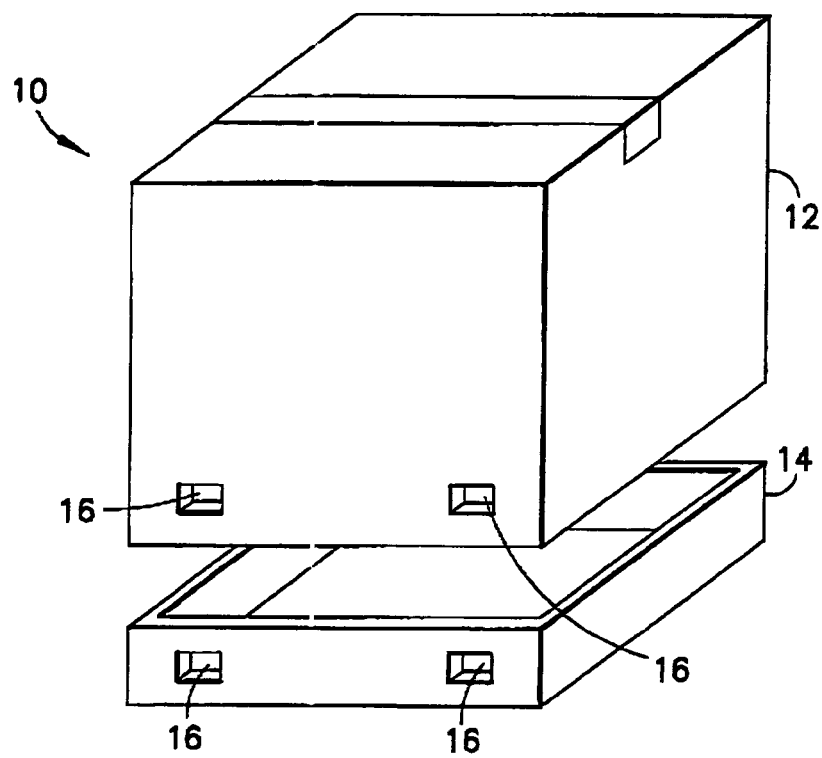
FIG. 1 is an exploded perspective view of members of a conventional multi-part container.
Figure 2:
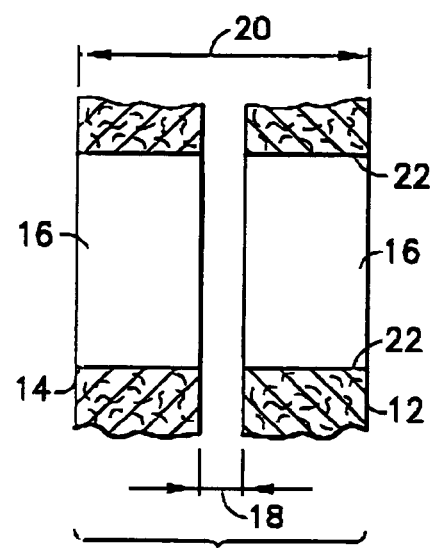
FIG. 2 is a partial cross sectional view of portions of the members shown in FIG. 1 at aligned connecting apertures.
Figure 3:
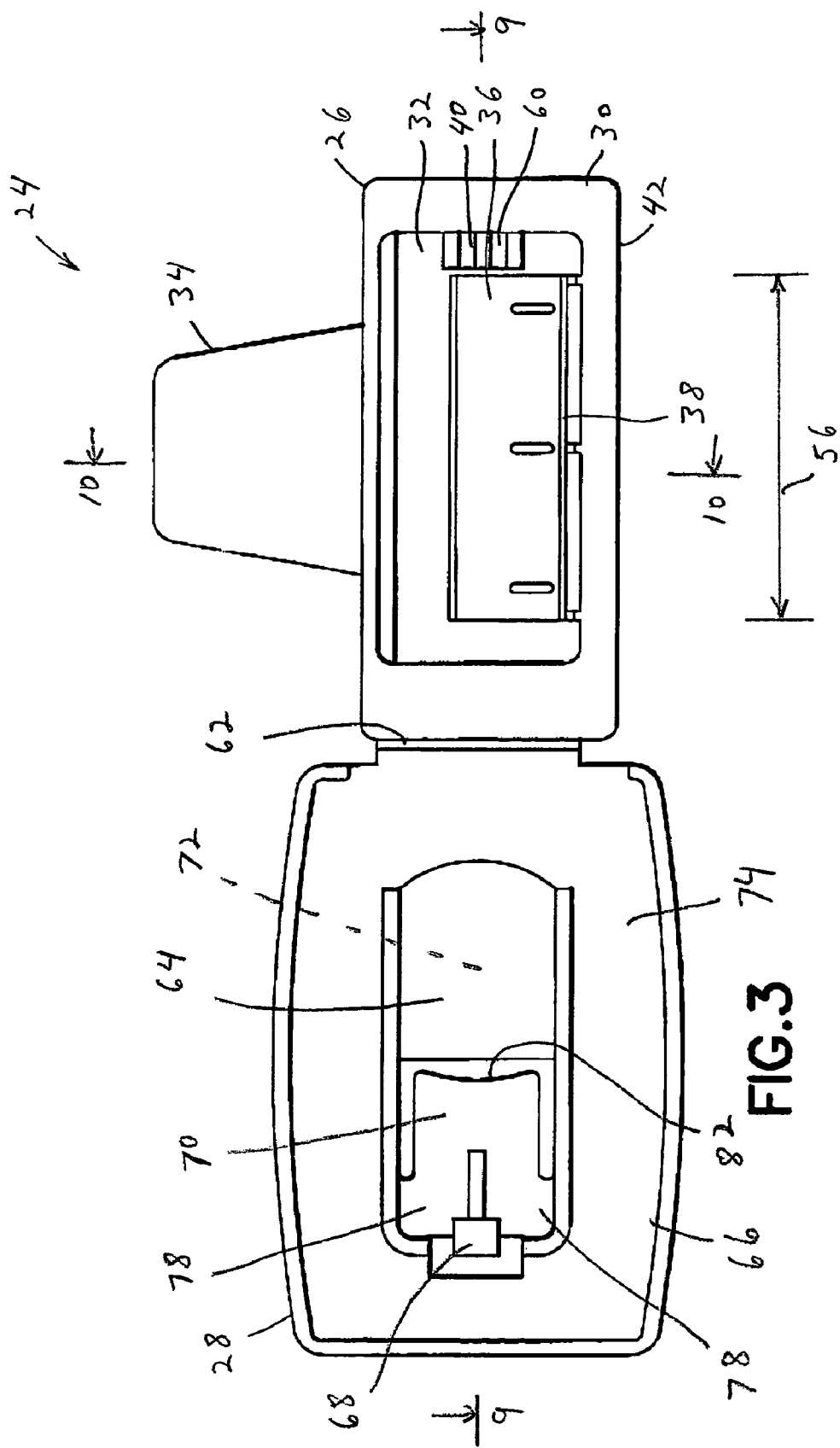
FIG. 3 is a front elevational view of a connecting clip incorporating features of the invention before connection to the members shown in FIGS. 1 and 2.
Figure 4:
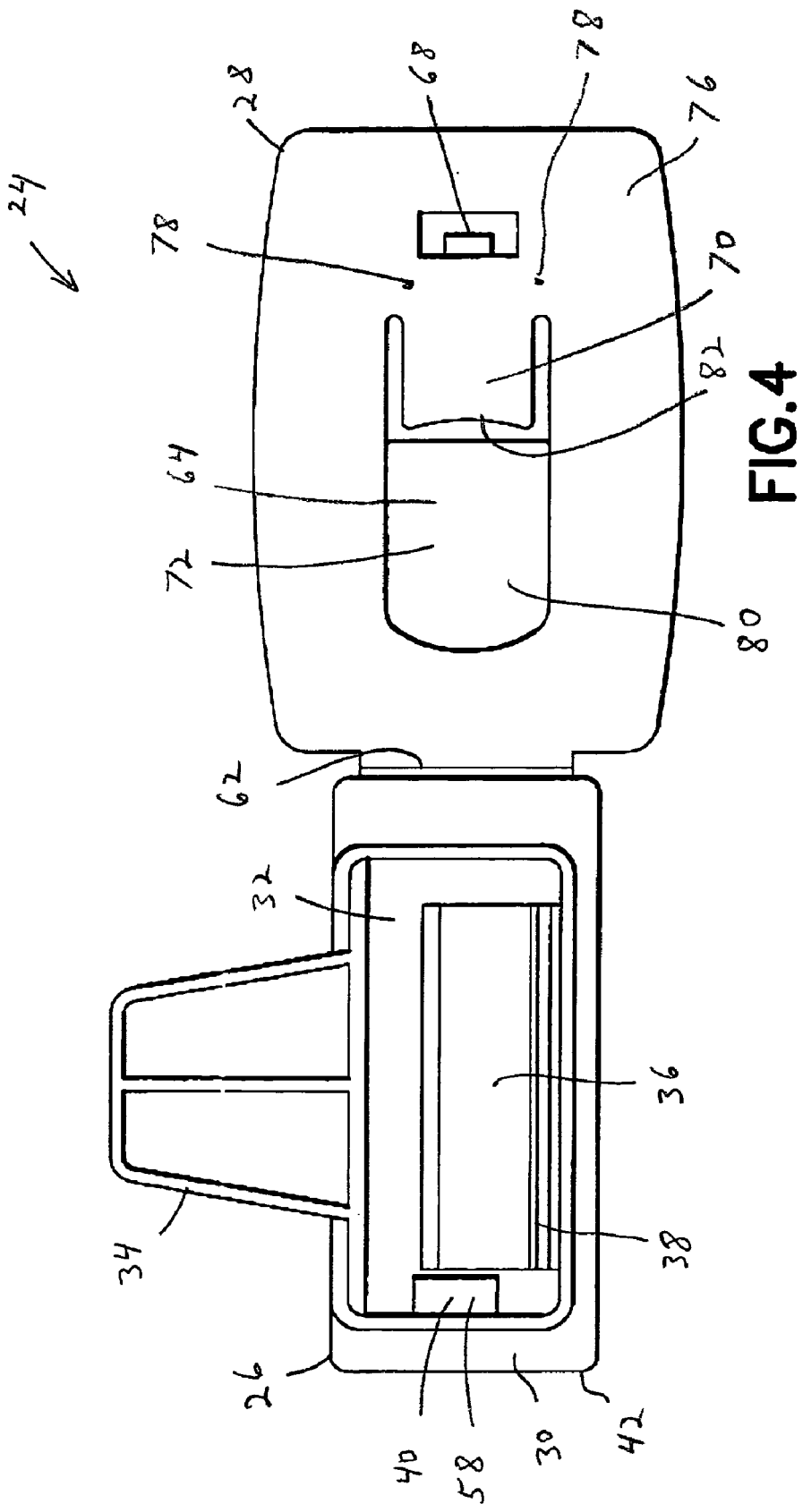
FIG. 4 is rear elevational view of the connecting clip shown in FIG. 3.
Figure 5:
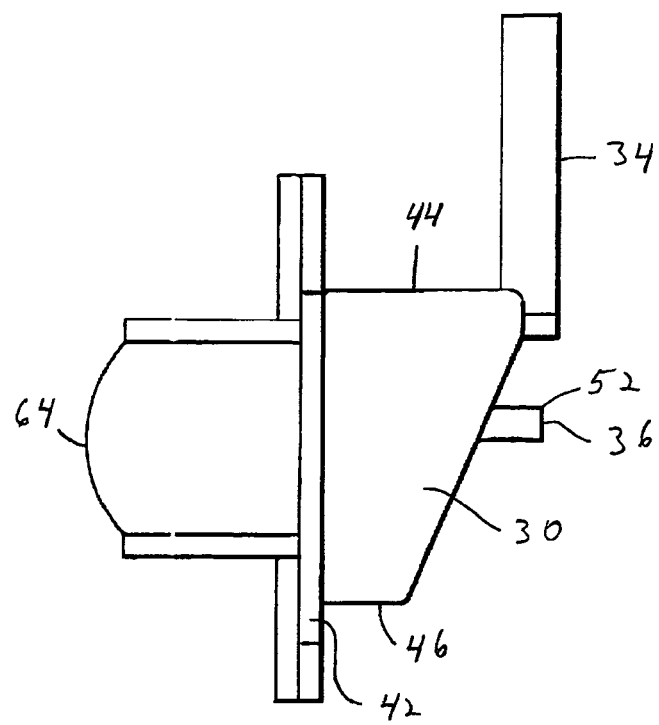
FIG. 5 is an elevational right side view of the connecting clip shown in FIG. 3.
Figure 8:
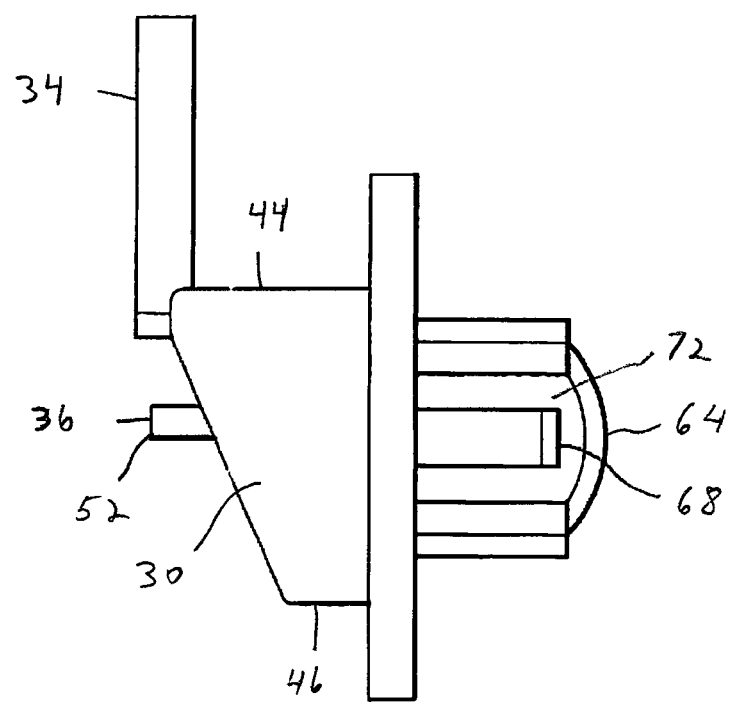
FIG. 8 is an elevational left side view of the connecting clip shown in FIG. 3.
Figure 9:
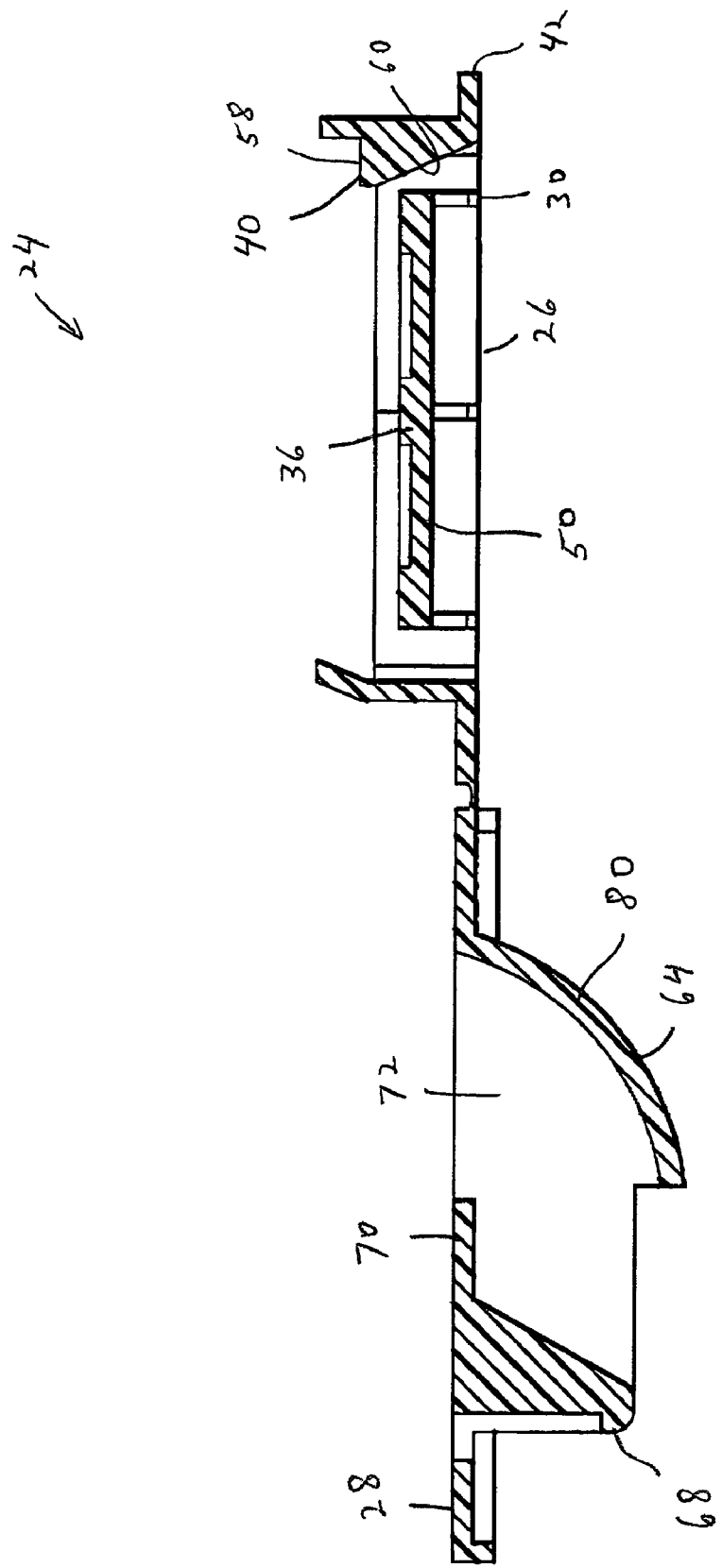
FIG. 9 is a cross sectional view of the connecting clip shown in FIG. 3 taken along line 9-9.
Figure 10:
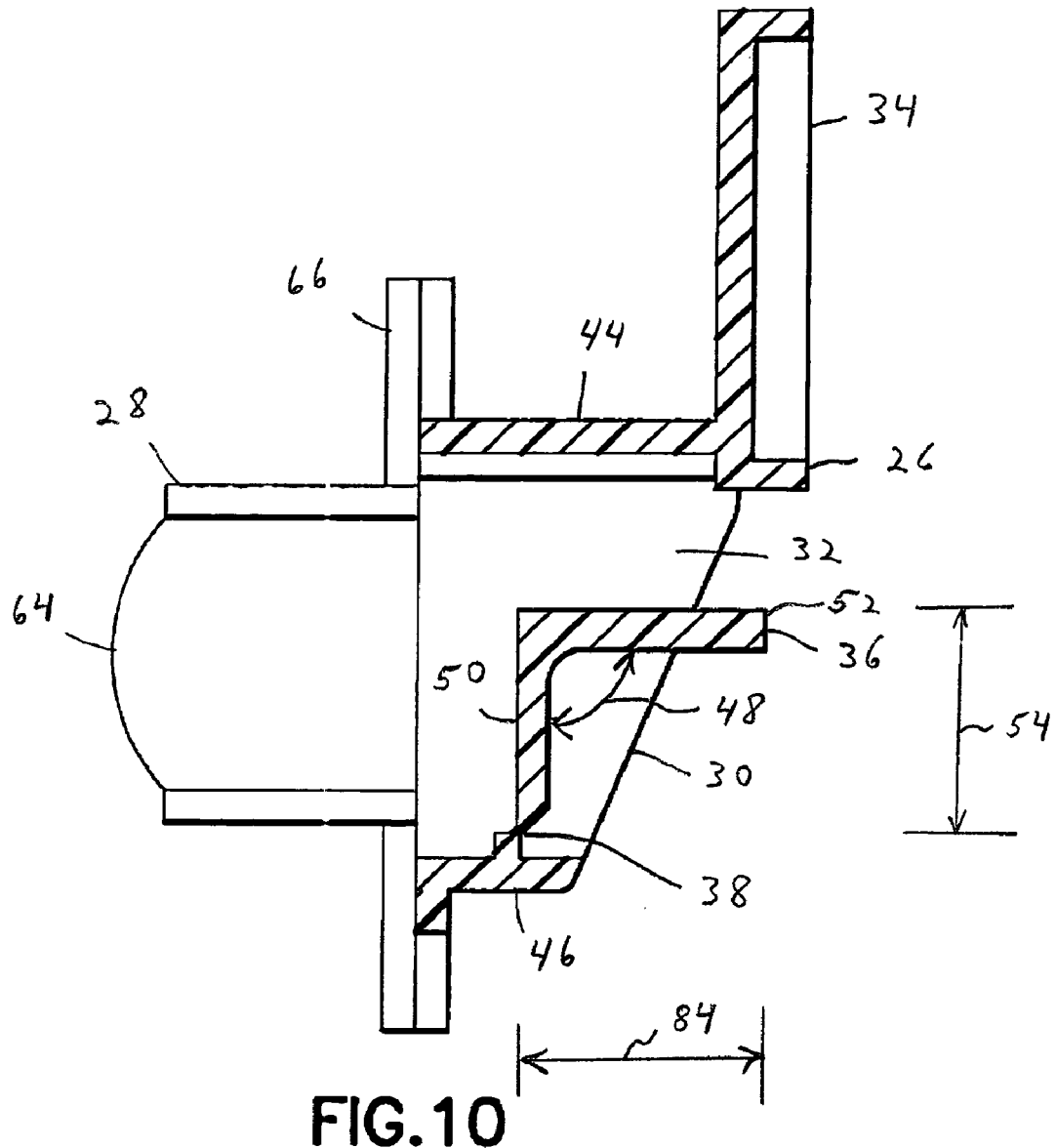
FIG. 10 is a cross sectional view of the connecting clip shown in FIG. 3 taken along line 10-10.

Referring to FIG. 1, there is shown an exploded perspective view of a conventional box 10 used as a shipping container for an article, such as a computer or a computer monitor for example. Features of the invention could be used for any suitable multipart container or could be used to connect any suitable types of members together. The box 10 generally comprises a top member 12 and a bottom member 14. The members 12, 14 are made of a suitable material, such as cardboard for example. However, any the members 12, 14 could be made of any suitable material(s). In addition, more than two members could be provided. The bottom side of the top member 12 is open. The top side of the bottom member 14 is open. Side walls of the members 12, 14 have apertures 16. The article to be contained is placed on the bottom member 14. The top member 12 is then placed over the article and the bottom end of the top member 12 is inserted into the bottom member 14. The apertures 16 are aligned when the members 12, 14 are assembled. Referring also to FIG. 2, in many cases, there is a gap between the two members 12, 14 when they are initially assembled. As noted above, when attempting to connect the two members 12, 14 with conventional connecting clips, the gap 18 causes problems in the ability to close the clip. More specifically, the distance 20 between the outside and the inside of the box walls at the apertures 16 is too great for the flange portions of the connecting clips to reach. The connecting clips were designed to work for a distance without the gap 18 (i.e., distance 20−distance 18). Thus, the movable flange portions of the conventional connecting clips get stuck inside the aperture 16 of the top member 12 at surfaces 22.

Referring now to FIGS. 3-10, various views of one embodiment of a connecting clip 24 incorporating features of the invention are shown. Although the invention will be described with reference to the exemplary embodiment shown in the drawings, it should be understood that the invention can be embodied in many alternate forms of embodiments. In addition, any suitable size, shape or type of elements or materials could be used.

The connecting clip 24 is shown in its open position in FIGS. 3-10. The clip 24 is a one piece member comprised of molded plastic or polymer material. The clip 24 comprises a first section 26 and a second section 28. The first section 26 generally comprises a general ring shaped portion 30 forming a hole 32, a first stationary projection 34 extending away from the general ring shaped portion at a rear side of the general ring shaped portion, a movably second projection 36 connected to the general ring shaped portion by a first living hinge 38, and a snap-lock latch section 40 with a latching surface. The general ring shaped portion 30 generally comprises a flange section 42 at its front side. The rear side of the general ring shaped portion 30 has angled side walls and a top wall 44 which is longer in depth than the depth of the bottom wall 46. The general ring shaped portion 30 is sized and shaped to substantially stationarily fit inside a pair of the aligned apertures 16 of the members 12, 14. One of the side walls is substantially orthogonal to the top and bottom walls 44, 46, and the other side wall is angled relative to the top and bottom walls 44, 46. This provides a tolerance regarding the width of the apertures 16, and allows the ring shaped section to be easily wedged into the apertures 16.

As noted above, the first stationary projection 34 extends away from the general ring shaped portion 30 at a rear side of the general ring shaped portion. More specifically, the first stationary projection 34 is located a the rear of the top wall 44. The first stationary projection 34 extends upward from the top wall 44 in a general cantilevered fashion. Preferably, the front side of the stationary projection 34 is marked with indicia such as an arrow and the word "UP" to indicate orientation of the connecting clip when the clip is being inserted into the apertures 16. In this embodiment the stationary projection 34 has a general pyramid profile. However, any suitable shape could be provided. In an alternate embodiment, rather than a single stationary projection, the connecting clip could comprise more than one stationary projection 34.

The movably second projection 36 and the first living hinge 38 are connected to the interior side of the bottom wall 46. In this embodiment the second projection 36 has a general L shape. However, the angle 48 between the two legs 50, 52 of the L shape are angled at an angle less than 90 degrees. In the open position shown, the first leg 50 extends up from the inside surface of the bottom wall 46 in the hole 32, and the second leg 52 extends in a general rearward direction out of the hole 32. The height 54 and length 56 of the first leg 50 inside the hole 32 is more than half the height and length of the hole 32. The first living hinge 38 is located about half the distance of the depth of the bottom wall 46. However, in an alternate embodiment the living hinge could have any suitable location or could be replace with another type of hinge or moving joint. In this embodiment the depth 84 of the second leg 52 is shorter than the height of the first projection 43, such as one-half the distance for example. However, any suitable dimensions could be provided. Rather than the single movably second projection, in an alternate embodiment the connecting clip could be provided with more than one movably second projection, and one or more could be located on the side walls.

The snap-lock latch section 40 is located in the hole 32 on the inside surface of one of the side walls of the ring shaped section 30. The snap-lock latch section 40 has a rearward facing latch surface 58 and a front ramp surface 60.

The second section 28 is movably connected to the first section 26 by a second living hinge 62. In an alternate embodiment the second living hinge could be replaced by two or more living hinges or a movable connection or joint other than a living hinge. The second living hinge 62 is located at a junction between lateral sides of the first and second sections 26, 28. However, in an alternate embodiment the first and second sections and the second living hinge could be at any suitable sides.

The second section 28 generally comprises a pushing portion 64, a flange 66, a cantilevered snap-lock latch 68, a latch release or delatching lever 70, and a finger recess 72. The flange 66 is connected to the second living hinge 62. The pushing portion 64 extends from face 74 of the flange section 66 and has a general hollow block shape. With the clip 24 open, the face 74 is a front facing face. However, when the clip 24 is closed, the face 74 becomes a rearward facing face and the face 76 becomes a forward facing face. The snap-lock latch 68 extends from the face 74 at an open gap in a side of the pushing portion 64. The latch 68 is connected to the rest of the second section by two deflectable connecting legs 78. The delatching lever 70 extends from the base of the latch 68 partially in front of the finger recess 72. The finger recess 72 extends into the pushing portion 64 from the face 76. The wall 80 at the rear of the finger recess 72 is curved to help guide a person's finger behind the delatching lever 70. The end of the delatching lever 70 has a curve 82 also to accommodate a user's finger. The lever 70 can be pulled outward by a user's finger to cause the connecting legs 78 to bend and pivot the distal end of the cantilevered latch 68 in an inward direction.

Figure 11:
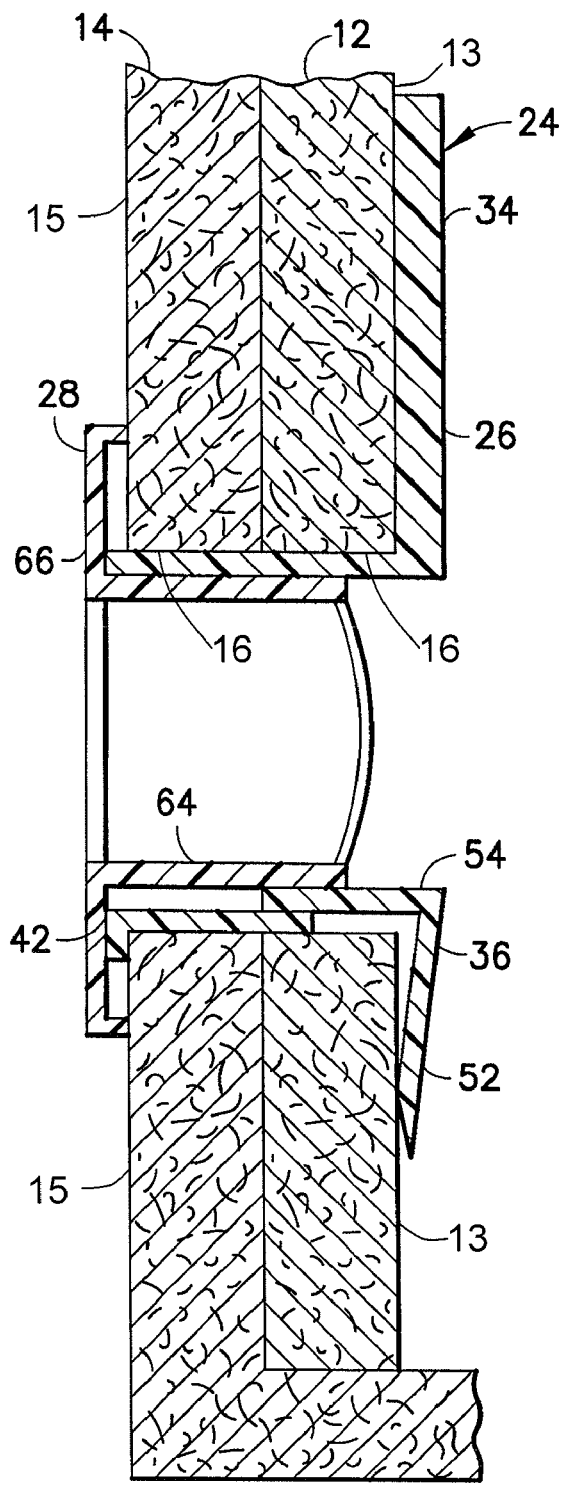
FIG. 11 is a cross sectional view of the connecting clip shown in FIGS. 3-10 shown attached to the two members shown in FIGS. 1 and 2.

Referring also to FIG. 11, the connecting clip 24 is shown connecting the two members 12, 14 to each other. The clip 24 is in its closed position. When the clip 24 is first inserted, it is in its open position. The stationary first projection 34 is first inserted into the apertures 16 and behind the back of the top member 12. The ring shaped portion is inserted into the two apertures 16, and the flange section 42 is located against the outer side 15 of the bottom member 14. The stationary first projection 34 has a suitable height to pull the two members 12, 14 (if there is a gap 18) to eliminate or at least reduce the size of the gap between the two members 12, 14.

After the first section 26 is inserted, the user then rotates the second section 28 at the second living hinge 62 to move the pushing portion 64 into the front of the hole 32. As the pushing portion 64 moves into the hole 32 it pushes against the second projection 36. This cause the second projection to rotated downward at the first living hinge 38. The first leg 54 extends rearward and out of the hole 32 with the pushing portion sandwiching the first leg 54 against the interior surface of the bottom wall 46 of the ring shaped portion 30. The second leg 52 extends downward and against the interior surface 13 of the top member 12; preferably being slightly deflected to spring bias the second projection 36 against the interior side of the top member 12. The latch 68 snap-lock latches with the latch section 40. This completes assembly of the connecting clip 24 to the two members 12, 14.

The connecting clip 24 is a removable connecting clip. In order to remove the connecting clip 24, and thereby easily disconnect the two members 12, 14 from each other, a user can actuate the delatching lever 70 to unlatch the latch 68 from the latch section 40. The user then merely rotates the second section 28 open and out of the hole 32. The second projection 36 will rebound upward slightly, due to resilience in the first living hinge 38, and the user can easily pull the first section 26 out of the apertures. The ornamental design of the connecting clip is also new.

One of the features of the invention is the provision of the first projection 34 as a stationary or substantially rigid projection in combination with the provision of the second projection 36 which is movable, but which can be locked into a stationary deployed position (see FIG. 11). Unlike conventional box connecting clips which use two movably projections, the combination in the invention allows the clip 24 to be more easily connected to the members 12, 14, and also stay connected until positively removed by a user.

Another feature of the invention is the configuration of the latching and unlatching system including latch 68, lever 70, legs 78, and curve 82. The latching and unlatching system provides a more ergonomic design which is easier to use than conventional box connecting clips which use two movably projections, and is also a more secure latching system to prevent unintentional unlatching of the second section 28 is latched to the first section 26 inside the hole 32.

It should be understood that the foregoing description is only illustrative of the invention. Various alternatives and modifications can be devised by those skilled in the art without departing from the invention. Accordingly, the invention is intended to embrace all such alternatives, modifications and variances which fall within the scope of the appended claims.

What is claimed is:

1. A connecting clip for connecting two members to each other at apertures through the two members, the connecting clip comprising:
a first section comprising a general ring shaped portion forming a hole, a first stationary projection extending in a first direction from the general ring shaped portion at a rear side of the general ring shaped portion, and a single movable second projection connected to the general ring shaped portion by a first living hinge, wherein the general ring shaped portion is adapted to extend inside at least one of the apertures, wherein the first stationary projection extends from a top wall of the hole, wherein the second projection extends from a bottom wall of the hole, wherein the second projection extends more than half a height of the hole, wherein the second projection is movable to a deployed position extending out of the hole with an end of the second projection extending in a second direction substantially opposite to the first direction, and wherein the hole extends in a third direction substantially perpendicular to the first and second directions; and
a second section movably connected to the first section by a second living hinge, wherein the second section comprises a pushing portion adapted to push against the second projection when the second section is moved from an open position to a closed position to thereby move the second projection to the deployed position, and wherein the pushing portion forms a finger recess adapted to allow a user to insert a finger into the recess from a front side of the second section when the second section is in the closed position.

2. A connecting clip as in claim 1 wherein the first section comprises a latching surface connected to the ring shaped portion and the second section comprises a deflectable latch adapted to engage the latching surface, 3. A connecting clip as in claim 1 wherein the second projection comprises a general L shaped member, 4. A connecting clip as in claim 1 wherein the second section comprises a flange and the pushing portion extends from the flange.

5. A connecting clip as in claim 1 wherein the second section comprises a deflectable cantilevered latch and a latch release lever extending in front of a portion of the finger recess.

6. A connecting clip as in claim 1 wherein the connector clip is a single molded piece.

7. A connecting clip for connecting two members to each other at apertures through the two members, the connecting clip comprising:
a first section comprising a general ring shaped portion forming a hole, a first stationary projection extending in a first direction from the general ring shaped portion proximate a rear side of the general ring shaped portion, and a movable second projection connected to the general ring shaped portion by a first living hinge, wherein the second projection is movable to a deployed position with an end of the second projection extending in a second direction substantially opposite to the first direction; and
a second section movably connected to the first section by a second living hinge, wherein the second section comprises a pushing portion extending from a face of the second section, wherein the pushing portion is adapted to push against the second projection when the second section is moved from an open position to a closed position to thereby move the second projection to the deployed position;
wherein a hinge axis of the first living hinge is substantially orthogonal to a hinge axis of the second living hinge, and wherein the first direction is substantially parallel to the face of the second section when the second section is in the closed position such that the first stationary projection extends from the general ring shaped portion in the direction substantially parallel to the face of the second section when the second section is in the closed position.

8. A connecting clip for connecting two members to each other at apertures through the to members, the connecting clip comprising:
a first section comprising'a general ring shaped portion forming a hole, a first projection extending in a first direction from the general ring shaped portion proximate a rear side of the general ring shaped portion, and a movable second projection connected to the general ring shaped portion by a first living hinge, wherein at least a part of the general ring shaped portion is adapted to extend through the apertures of the two members, and wherein the second projection is movable to a deployed position with an end of the second projection extending in a second direction substantially opposite to the first direction; and a second section movably connected to the first section by a second living hinge, wherein the second section comprises a pushing portion adapted to push against the second projection when the second section is moved from an open position to a closed position to thereby move the second projection to the deployed position, wherein the second section comprises a latching and unlatching system adapted to latch and unlatch the second section with the first section, wherein the latching and unlatching system comprises a cantilevered deflectable snap-lock latch connected to a finger operated lever by at least one deformable leg, and wherein the cantilevered deflectable snap-lock latch is adapted to extend inside the hole formed by the general ring shaped portion.

* * * * *